(12) United States Patent
Jung et al.

(10) Patent No.: US 8,114,467 B2
(45) Date of Patent: Feb. 14, 2012

(54) POLYMER FOR FORMING HYDROPHOBIC LAYER, HYDROPHOBIC LAYER COMPRISING THE POLYMER AND ELECTRONIC ARTICLE COMPRISING THE HYDROPHOBIC LAYER

(75) Inventors: Won-cheol Jung, Seoul (KR); Bum-jae Lee, Daejeon (KR); Jong-seop Lee, Daejon (KR); Young-nam Kwon, Gunpo-si (KR); Tae-jung Kim, Daejon (KR)

(73) Assignees: Samsung Electronics Co., Ltd. (KR); Chungnam National University Industry Foundation (KR)

( * ) Notice: Subject to any disclaimer, the term of this patent is extended or adjusted under 35 U.S.C. 154(b) by 701 days.

(21) Appl. No.: 12/178,591

(22) Filed: Jul. 23, 2008

(65) Prior Publication Data

US 2009/0191328 A1 Jul. 30, 2009

(30) Foreign Application Priority Data

Jan. 30, 2008 (KR) .................. 10-2008-0009684

(51) Int. Cl.
*C08F 214/18* (2006.01)
(52) U.S. Cl. .................. 427/58; 526/249; 526/335
(58) Field of Classification Search .................. 427/58; 526/249, 335
See application file for complete search history.

(56) References Cited

U.S. PATENT DOCUMENTS 6,025,455 A * 2/2000 Yoshitake et al. .............. 528/10
6,956,093 B1 * 10/2005 Hsu et al. ...................... 526/335
7,288,134 B2 * 10/2007 Sun et al. ......................... 75/348
7,557,072 B2 * 7/2009 Futterer et al. ................ 510/136
7,842,337 B2 * 11/2010 Kim et al. .................. 427/163.1

\* cited by examiner

*Primary Examiner* — Peter D. Mulcahy
*Assistant Examiner* — Henry Hu
(74) *Attorney, Agent, or Firm* — Cantor Colburn LLP

(57) ABSTRACT

Provided are hydrophobic layer formed by polymer represented by Formula 1 below and has a weight average molecular weight of about 10,000 to about 500,000 g/mol, hydrophobic layer including the polymer and an electronic articles including the hydrophobic layer:

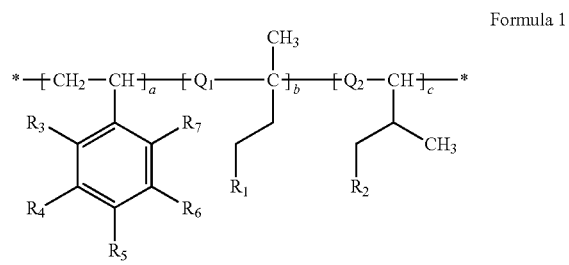

Formula 1 wherein $Q_1$, and $Q_2$ are independently linear or branched $C_1$-$C_{10}$ alkylene groups, $R_1$ and $R_2$ are independently ether and/or ester containing substituents, $R_3$ to $R_7$ are independently selected from a hydrogen atom, a halogen atom, a cyano group, an amino group, a $C_1$-$C_{10}$ alkyl group and a $C_6$-$C_{12}$ aryl group; and the ratio of a:b+c is from 10:1 to 1:1,000. A coated electronic article comprising the hydrophobic layer and a method of forming the coated electronic article are also provided.

6 Claims, 4 Drawing Sheets

POLYMER FOR FORMING HYDROPHOBIC LAYER, HYDROPHOBIC LAYER COMPRISING THE POLYMER AND ELECTRONIC ARTICLE COMPRISING THE HYDROPHOBIC LAYER

This application claims priority to Korean Patent Application No. 10-2008-0009684, filed on Jan. 30, 2008, and all the benefits accruing therefrom under 35 U.S.C. §119, the content of which is incorporated herein by reference in its entirety.

BACKGROUND OF THE INVENTION

1. Field of the Invention

The present invention relates to a polymer, a hydrophobic layer including the polymer, an article including the hydrophobic layer, and more particularly, to a polymer including a fluorinated organic group having superior hydrophobicity and stability, a hydrophobic layer including the polymer and an article including the hydrophobic layer.

2. Description of the Related Art

Most articles in our daily lives, such as electronic articles, household articles, and construction materials, circulate in and are used in environments in which the articles are in contact with a variety of microparticles and/or microorganisms. Microorganisms can attach to the surface of articles which are in contact with them, and the various microorganisms can in turn form microcolonies, where a microcolony can proliferate to form a macrocolony and subsequently a biofilm. Such colonies of microorganisms may cause deterioration of properties of the articles such as aesthetic properties, stability properties, and sanitary conditions. Meanwhile, when an article is used in an environment affected by temperature change, moisture in the form of for example dew and frost may also form on the surface of the article since moisture in the air may attach (e.g., by adsorption) to the surface. Such moisture present at the surface of the article may also cause deterioration in the aesthetic properties, stability properties, or the like, of the article.

To prevent damage caused by such microorganisms and moisture, research has been conducted on methods of forming a surface layer which includes inorganic antimicrobials such as Ag, Zn and Cu, or organic antimicrobials, on the surfaces of articles.

Inorganic antimicrobials, however, are not readily dispersed within such surface layers, and may cause the transparency of the layer to deteriorate. Further, organic antimicrobials have short antimicrobial efficacy time periods and therefore lack antimicrobial durability, and are further restricted by environmental regulations.

It is therefore desirable to provide an environmentally safe, nontoxic surface which can efficiently prevent microorganisms from being attached to the surface of the articles and proliferating thereon which further retains the desirable properties for the article.

BRIEF SUMMARY OF THE INVENTION

Thus, in an embodiment, a polymer for forming a hydrophobic layer is represented by Formula 1 below and has a weight average molecular weight (Mw) of about 10,000 to about 500,000 g/mol:

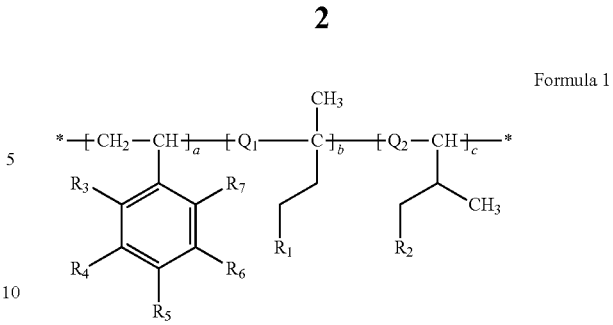

Formula 1 wherein $Q_1$ and $Q_2$ are each independently a linear or branched $C_1$-$C_{10}$ alkylene group;

$R_1$ and $R_2$ are each independently a substituent selected from the group consisting of —O—$Z_1$, —O—C(O)—$Z_2$, —O—$Z_3$—C(O)—O—$Z_4$ and —O—C(O)—$Z_5$—C(O)—O—$Z_6$; wherein $Z_1$, $Z_2$, $Z_4$ and $Z_6$ are each independently a linear or branched $C_1$—$C_{30}$ alkyl group, wherein at least one hydrogen atom of the linear or branched $C_1$-$C_{30}$ alkyl group is substituted with F; and $Z_3$ and $Z_5$ are each independently a linear or branched $C_1$-$C_{20}$ alkylene group, wherein at least one hydrogen atom of the linear or branched $C_1$-$C_{20}$ alkylene group is substituted by one of Cl, Br and I;

$R_3$ to $R_7$ are each independently a hydrogen atom, a halogen atom, a cyano group, an amino group, a $C_1$-$C_{10}$ alkyl group or a $C_6$-$C_{12}$ aryl group; and the ratio of a:b+c is in the range of 10:1 to 1:1,000.

In an embodiment, a hydrophobic layer includes the polymer.

In an embodiment, an electronic article includes the hydrophobic layer having the polymer.

In another embodiment, a method of forming a coated electronic article, comprises coating an electronic article with a mixture of a polymer represented by Formula 1 and having a weight average molecular weight of about 10,000 to about 500,000, and a solvent, and heat treating the coated mixture to form a hydrophobic layer comprising the polymer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
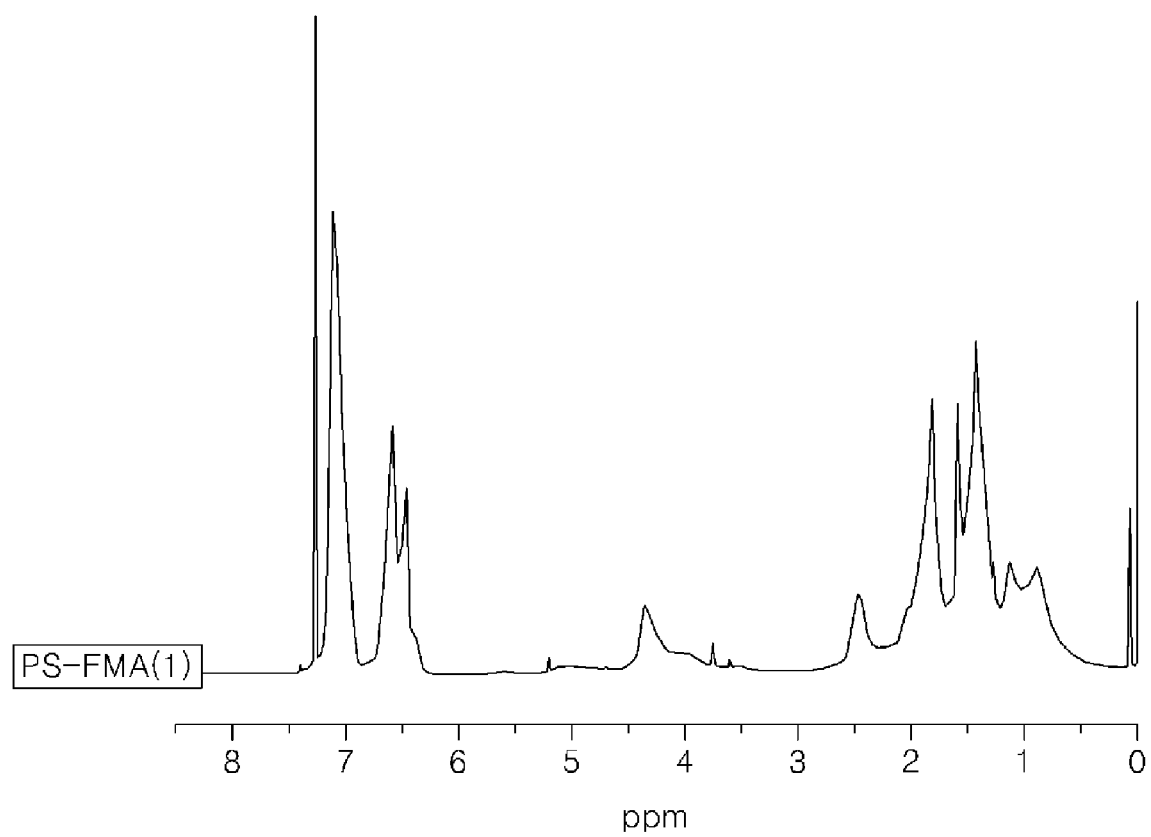
FIG. 1A is a $^1$H-NMR spectrum of an exemplary polymer according to an embodiment.

Hereinafter, the present invention will now be described more fully with reference to the accompanying drawings, in which exemplary embodiments of the invention are shown.

It will be understood that when an element is referred to as being "on" another element, it can be directly on the other element or intervening elements can be present therebetween. In contrast, when an element is referred to as being "disposed on", "interposed between", or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A polymer useful for forming a hydrophobic layer is represented by Formula 1 below:

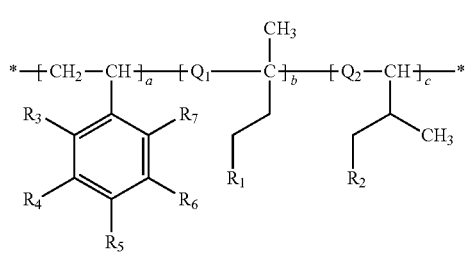

Formula 1 wherein, $Q_1$ and $Q_2$ are each independently a linear or branched $C_1$-$C_{10}$ alkylene group, and preferably $C_1$-$C_5$ alkylene group. For example, $Q_1$ and $Q_2$ may be each independently a methylene group, an ethylene group or a propylene group.

In Formula 1, $R_1$ and $R_2$ are each independently a substituent selected from the group consisting of —O—$Z_1$, —O—C(O)—$Z_2$, —O—$Z_3$—C(O)—O—$Z_4$ and —O—C(O)—$Z_5$—C(O)—O—$Z_6$. A polymer including $R_1$ and $R_2$ with a structure described above may have superior hydrophobicity. In particular, when $R_1$ and $R_2$ are each independently —O—$Z_1$ or —O—C(O)—$Z_2$, $Z_1$ and $Z_2$ are not connected to an ester group, and when $R_1$ and $R_2$ are —O—$Z_3$—C(O)—O—$Z_4$ and —O—C(O)—$Z_5$—C(O)—O—$Z_6$, $Z_3$ and $Z_5$ are connected to only a single ester group. Thus, a layer including the polymer may have superior hydrophobicity.

$Z_1$, $Z_2$, $Z_4$ and $Z_6$ are each independently a linear or branched $C_1$-$C_{30}$ alkyl group, wherein at least one hydrogen atom of the linear or branched $C_1$-$C_{30}$ alkyl group is substituted with F. That is, in Formula 1, $R_1$ and $R_2$ are a terminal group (i.e., $Z_1$, $Z_2$, $Z_4$ and $Z_6$) necessarily including a linear or branched $C_1$-$C_{30}$ alkyl group substituted with at least one F.

$Z_1$, $Z_2$, $Z_4$ and $Z_6$ may be each independently —$(CH_2)_{p_1}$-$(CF_2)_{q_1}$F, —$(CH_2)_{p_2}$-$(CF_2)_{q_2}$-$C(CF_3)F_2$ or —$(CH_2)_{p_3}$-$(CF_2)_{q_3}$-$C(CF_3)_2$F, but are not limited thereto. Here, $p_1$ to $p_3$ are each independently an integer of 1 to 5, and preferably 1 to 3. Meanwhile, $q_1$ to $q_3$ are each independently an integer of 1 to 20, preferably 3 to 15, and more preferably 5 to 10.

$R_1$ and $R_2$, $Z_3$ and $Z_5$ are each independently a linear or branched $C_1$-$C_{20}$ alkylene group, wherein at least one hydrogen atom of the $C_1$-$C_{20}$ alkylene group may be substituted with Cl, Br or I. In the linear or branched $C_1$-$C_{20}$ alkylene group which may be $Z_3$ or $Z_5$, F, Cl or Br may be a reaction site of a subsequent reaction. Thus, a variety of functional groups may further be added to the polymer of the present invention.

$Z_3$ and $Z_5$ may be each independently —$CH(CH_3)$—$(CH_2)_{p_4}$-$C(CH_3)(Br)$—, —$CH(CH_3)$—$(CH_2)_{p_5}$-$C(CH_3)H$—, —$CH(CH_3)$—$(CH_2)_{p_6}$- or —$(CH_2)_{p_7}$—$C(CH_3)(Br)$—, but are not limited thereto. Here, $p_4$ to $p_7$ are each independently an integer of 1 to 10, and preferably 1 to 5.

The polymer represented by Formula 1 including $R_1$ and $R_2$ has superior hydrophobicity. Thus, a hydrophobic layer including the polymer of Formula 1 has a high contact angle and a low surface energy, thereby efficiently preventing microorganisms from being attached to the surface of the hydrophobic layer and proliferating thereon even when in contact with the microorganisms. In addition, the hydrophobic layer is not involved in chemical reactions with oxygen or moisture during long-term exposure to oxygen or moisture. Thus, the hydrophobic layer including the polymer is not substantially damaged by the surroundings and the hydrophobicity thereof is not decreased during long-term exposure to surrounding stress, thereby affording superior stability and environmental resistance for the layer.

More particularly, in a specific embodiment, $R_1$ and $R_2$ may be —$OCH_2CH_2C_2F_5$, —$OCH_2CH_2CH_2C_2F_5$, —$OCH_2CH_2C_3F_7$, —$OCH_2CH_2CH_2C_3F_7$, —O—C(O)—$CH_2CH_2C_2F_5$, —O—C(O)—$CH_2CH_2CH_2C_2F_5$, —O—C(O)—$CH_2CH_2C_3F_7$, —O—C(O)—$CH_2CH_2CH_2C_3F_7$, —O—C(O)—$CH(CH_3)$—$CH_2$—$C(CH_3)(Br)$—C(O)—O—$(CH_2)_2$—$(CF_2)_6F$, —O—C(O)—$CH(CH_3)$—$CH_2$—$C(CH_3)(Br)$—C(O)—O—$(CH_2)_2$—$(CF_2)_8F$, or —O—C(O)—$CH(CH_3)$—$CH_2$—$C(CH_3)(Br)$—C(O)—O—$(CH_2)_2$—$(CF_2)_8$—$C(CF_3)_2F$, but are not limited thereto.

In Formula 1, $R_3$ to $R_7$ are groups increasing hydrophobicity of the polymer of Formula 1, and are each independently a hydrogen atom, a halogen atom, a cyano group, an amino group, a $C_1$-$C_{10}$ alkyl group or a $C_6$-$C_{12}$ aryl group. $R_3$ to $R_7$ may be each independently a hydrogen atom or a $C_1$-$C_{10}$ alkyl group.

In Formula 1, a, b and c indicate numbers of repeating units, and the ratio of a:b+c is from 10:1 to 1:1,000, and preferably 7:1 to 1:100, which may be selected in accordance with a weight average molecular weight to be described below. When the ratio among a, b and c is within the ratio described above, superior hydrophobicity is obtained.

The weight average molecular weight (Mw) of the polymer of Formula 1 may be from about 10,000 to about 500,000 g/mol, and preferably from about 10,000 to about 200,000 g/mol. When the weight average molecular weight of the polymer is within the range, superior film processability may be obtained.

The polymer may be used to form a hydrophobic layer. According to another embodiment, a hydrophobic layer including the polymer represented by Formula 1 is provided.

The hydrophobic layer including the polymer may further include at least one of inorganic particles, polymer beads and carbonaceous particles in order to improve hydrophobicity of the layer. The inorganic particles may be $SiO_2$, $Al_2O_3$, ZnO and $TiO_2$, but are not limited thereto. The polymer beads may be polystyrene beads, but are not limited thereto. Examples of the carbonaceous particles are carbon nanotube, carbon nanohorn, graphite, diamond-like carbon ("DLC"), carbon black and fullerenes, (e.g., $C_{60}$), but are not limited thereto. A combination of at least two of the foregoing may be used.

An average particle diameter of the inorganic particles, polymer beads and carbonaceous particles may be from about 10 nm to about 10 μm, and preferably from about 15 nm to about 5 μm. When the average particle diameter is within the range, hydrophobicity may be efficiently improved.

The hydrophobic layer further includes at least one of the followings; inorganic particles, polymer beads and carbonaceous particles. The weight ratio of the polymer of Formula 1 to at least one of the inorganic particles, the polymer beads, and the carbonaceous particles is from about 10:1 to about 1:10, and preferably from about 9:1 to about 1:5.

When the hydrophobic layer further includes at least one of inorganic particles, polymer beads and/or carbonaceous particles, surface roughness of the hydrophobic layer may increase. The hydrophobic layer further including at least one of the inorganic particles, polymer beads and carbonaceous particles may have a surface roughness with a root means squared (RMS) of about 15 to about 400 nm, although the surface roughness may vary according to the type and amount of the inorganic particles, polymer beads and carbonaceous particles. Thus, hydrophobicity is increased.

The hydrophobic layer according to the present invention may have a contact angle with water of from about 90° to about 160°. The hydrophobic layer may also have a contact angle with diiodomethane of from about 75° to about 90°. In addition, surface energy of the hydrophobic layer is as low as about 15 to about 25 dyne/cm. Accordingly, the hydrophobic layer has superior hydrophobicity, thereby substantially preventing adhesion and proliferation of microorganisms.

The hydrophobic layer may be formed using a simple wet process. That is, a hydrophobic layer including a polymer represented by Formula 1 may be formed on a substrate by preparing a mixture of a polymer represented by Formula 1 and a solvent, supplying the mixture to a substrate, and heat-treating the mixture. Here, a hydrophobic layer further including at least one of inorganic particles, polymer beads and carbonaceous particles in addition to the polymer of Formula 1 may be formed by further adding at least one of the inorganic particles, polymer beads and carbonaceous particles thereto.

The solvent may be an organic solvent that is commonly used in the formation of films. The solvent may be chloroform, dimethylformamide ("DMF"), methyl ethyl ketone ("MEK"), methyl isobutyl ketone ("MIBK"), dimethyl sulfoxide ("DMSO"), tetrahydrofuran ("THF"), toluene, acetone, hexane, cyclohexane, dichloromethane, dichloroethane, ethyl acetate, acetonitrile, isopropanol, carbon tetrachloride, xylene, pyridine, pentane, ethyl benzene, bromodichloro methane and trichloroethylene, but are not limited thereto.

The mixture of the polymer of Formula 1 and the solvent may be supplied to the substrate using a known method. For example, any known method such as spin coating, deep coating, spray coating and inkjet printing may be used. Here, the substrate includes a surface of an article on which a hydrophobic layer is formed.

A heat-treatment is performed in order to remove solvent after supplying the mixture of the polymer of Formula 1 and the solvent to the substrate. Here, the temperature of the heat-treatment may vary according to the type of the solvent, but the heat-treatment may be performed at a temperature of about 50 to about 150° C. for about 5 minutes to about 2 hours.

As described above, the hydrophobic layer including the polymer of Formula 1 or the hydrophobic layer further including at least one of the followings: inorganic particles, polymer beads and carbonaceous particles. In this way, a hydrophobic layer can be formed by a simple and inexpensive wet coating method followed by heat-treatment.

The hydrophobic layer may be coated on the surface of a variety of articles where the presence of the hydrophobic layer prevents microorganisms from becoming attached to the surface of the hydrophobic layer or from proliferating thereon. Frost formed due to contact between moisture in the air and the surface of the articles may also be prevented. Examples of the article to be coated with the hydrophobic layer include, but are not limited to, electronic articles such as washing machines, vacuum cleaners, refrigerators, air conditioners, dish washers, dish dryers, electric pots, air cleaners, rice cookers, telephones, cellular phones, computers, electric razors/shavers, notebook computers, TVs, audio devices, DVDs, speakers, humidifiers and electronic ovens; bathroom wares such as bathroom mats, bathroom brushes, shampoo containers, soap cases, brushes and bathroom tile; living wares such as tooth brushes, hair styling irons, slip-soles, oil paper, masks, antifungal sprays and accessories; kitchenware such as sponges, kitchen knives, chopping boards, dehydrating envelopes, film packing materials, sinks, vegetable cleaning brushes, trash cans and lunch boxes; stationery items such as ball point pens, mechanical pencils, pencils, erasers, CDs and floppy disks; household equipment such as bathroom fixtures including toilets, bidets and water purifiers; toys such as stuffed toys, mini cars and mini airplanes; automobile parts such as steering wheels and interior materials for automobiles; construction materials such as flooring materials, wallpaper, tile, and coating materials; and fibers such as socks, clothing, towels, dishcloths, gauze, bedclothes, curtains and carpets; and others such as antifungal sand, credit card and pipe, but are not limited thereto. Thus, in an embodiment, a method of forming a coated electronic article, comprises coating an electronic article with a polymer represented by Formula 1. Coating may be effected by a known method. The polymer thereby forms a hydrophobic layer upon coating. The hydrophobic layer may be coated on any surface of an article to which it is desirable that attachment of microorganisms and/or microparticles be prevented.

Hereinafter, the present invention will be described in more detail with reference to the following examples. The following examples are for illustrative purposes and are not intended to limit the scope of the invention.

EXAMPLES

Synthesis Example 1

Polymer 1 (PSI(1)) was synthesized according to Reaction Scheme 1 below:

Reaction Scheme 1

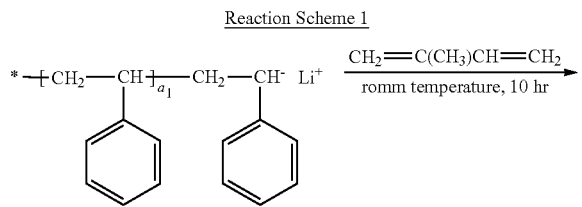

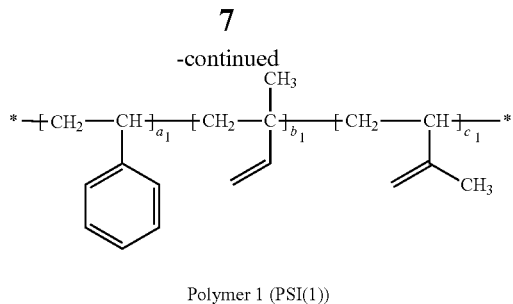

Polymer 1 (PSI(1))

100 ml of cyclohexane (Samchun Chemical) was added to a reactor under an argon atmosphere, and 9.2 ml (0.08 mol) of styrene (Aldrich Corporation), and 0.05 ml (0.33×10$^{-3}$ mol) of N,N,N',N'-tetramethylenediamine (TMEDA, Lancaster Corporation) were added to the reactor. Then, 0.235 ml (0.33×10$^{-3}$ mol) of 1.4M sec-butyl lithium (in cyclohexane) solution was added to the reaction mixture by injection, the ratio of the concentration of TMEDA to lithium is one ([TMEDA]/[Li]=1), and the reaction mixture was stirred at room temperature for 6 hours. Then, 8.92 ml (0.08 mol) of isoprene (Aldrich Corporation) was added and the mixture was stirred for 10 hours to synthesize Polymer 1 (PSI(1)). Then, after the reaction was terminated by adding methanol thereto, 0.2 g of 2,6-di-tert-butylphenol (Fluka Chemie AG) as 1% by weight of an antioxidant based on the weight of the polymer was added and precipitates were obtained using excess methanol to get Polymer 1 (PSI(1)). In Polymer 1 PSI(1), the ratio of $a_1:b_1+c_1$ was 284:140, wherein $a_1$, $b_1$ and $c_1$ are numbers of repeating units, and the weight average molecular weight was 39,100 g/mol.

Synthesis Example 2

Polymer 2 (PSI(4)) was synthesized in the same manner as in Synthesis Example 1, except that 9.2 ml (0.08 mol) of styrene, 13.4 ml (0.12 mol) of isoprene, 0.28 ml (0.39×10$^{-3}$ mol) of sec-butyl lithium, and 0.12 ml (0.78×10$^{-3}$ mol) of TMEDA, wherein the ratio of the concentration of TMEDA to lithium is two ([TMEDA]/[Li]=2), were used. In Polymer 2 (PSI(4)), the ratio of $a_1:b_1+c_1$ was 232:412, and the weight average molecular weight was 52,170 g/mol.

Synthesis Example 3

Polymer 3 (PSI(6)) was synthesized in the same manner as in Synthesis Example 1, except that 9.2 ml (0.08 mol) of styrene, 8.92 ml (0.08 mol) of isoprene, 0.235 ml (0.33×10$^{-3}$ mol) of sec-butyl lithium, and 0.05 ml (0.33×10$^{-3}$ mol) of TMEDA, wherein the ratio of the concentration of TMEDA to lithium is one ([TMEDA]/[Li]=1), were used. In Polymer 3 (PSI(6)), the ratio of $a_1:b_1+c_1$ was 228:248, and the weight average molecular weight was 40,600 g/mol.

Synthesis Example 4

Polymer 4 (PSI(7)) was synthesized in the same manner as in Synthesis Example 1, except that 9.2 ml (0.08 mol) of styrene, 13.4 ml (0.12 mol) of isoprene, 0.235 ml (0.33×10$^{-3}$ mol) of sec-butyl lithium, and 0.25 ml (1.65×10$^{-3}$ mol) of TMEDA, wherein the ratio of the concentration of TMEDA to lithium is five ([TMEDA]/[Li]=5), were used. In Polymer 4 (PSI(7)), the ratio of $a_1:b_1+c_1$ was 258:50, and the weight average molecular weight was 30,200 g/mol.

Synthesis Example 5

Intermediate A1 (PSI(1)-OH) was synthesized according to Reaction Scheme 2 below:

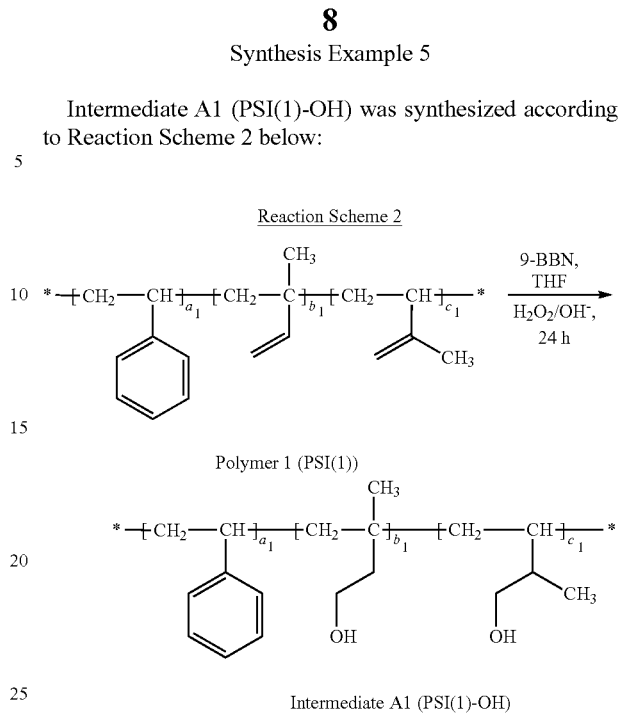

4.34 g (0.11×10$^{-3}$ mol) of the synthesized Polymer 1 (PSI(1)) was added to a reactor, and nitrogen was flown thereto for 30 minutes. Then, 150 ml of THF was added thereto using an injector, and the reactor was maintained at −15° C. Then, 26 ml (0.013 mol) of 9-borabicyclononane (9-BBN, 0.5 M solution in THF), which is more than 1.3 times of the number of vinyl group monomers, was dropped thereto and reacted at room temperature for 24 hours. Then, the reactor was cooled to −25° C., and 2.6 ml (0.013 mol) of aqueous 5M NaOH solution was added to the reactor. After 4.42 g (0.039 mol) of 30% w/w $H_2O_2$ in water was added to the reactor, the mixture was allowed to react at 50° C. for 3 hours. Then, the resultant was dried at a vacuum oven to provide Intermediate A1 (PSI(1)-OH).

Synthesis Example 6

Intermediate A2 (PSI(7)-OH) was synthesized in the same manner as in Synthesis Example 5, except that 1 g (3.25×10$^{-5}$ mol) of Polymer 4 (PSI(7)), 34 ml (0.017 mol) of 9-BBN (0.5M solution in THF), 3.4 ml (0.017 mol) of 5M NaOH solution in water, and 5.78 g (0.051 mol) of 30% w/w $H_2O_2$ in water were used.

Synthesis Example 7

Intermediate B1 (PSI(1)-Br) was synthesized according to Reaction Scheme 3 below:

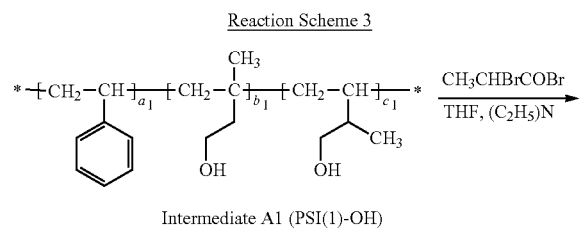

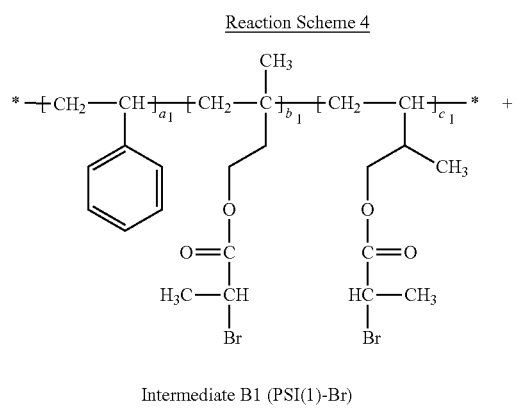

Intermediate B1 (PSI(1)-Br)

2.26 g (number of moles of the hydroxyl group: $5.2\times10^{-3}$ mol) of Intermediate A1 (PSI(1)-OH) was added to a reactor, and the reactor was purged with argon for 30 minutes. Then, 30 ml of THF was added thereto by injecting, and 0.82 ml ($7.8\times10^{-3}$ mol) of 2-bromopropionylbromide and 1.08 ml ($7.8\times10^{-3}$ mol) of triethylamine were added thereto in an amount of 1.5 times the number of moles of hydroxyl groups of Intermediate A1 (PSI(1)-OH). The mixture was stirred at room temperature for 24 hours. Then, the resultant was filtered using silica (Merck, 70~230 mesh), precipitated using methanol, and dried in a vacuum oven to obtain Intermediate B1 (PSI(1)-Br). The weight average molecular weight of Intermediate B1 (PSI(1)-Br) was 49,200 g/mol.

Synthesis Example 8

Intermediate B2 (PSI(7)-Br) was synthesized in the same manner as described in Synthesis Example 7, except that 3.25 g (number of moles of the hydroxyl group: $4.3\times10^{-3}$ mol) of Intermediate A2 (PSI(7)-OH), 0.68 ml ($6.45\times10^{-3}$ mol) of 2-bromopropionylbromide, and 0.9 ml ($6.45\times10^{-3}$ mol) of triethylamine were used. The weight average molecular weight of Intermediate B2 (PSI(7)-Br) was 35,000 g/mol.

Synthesis Example 9

Polymer 5 (PS-FMA(1)) was synthesized according to Reaction Scheme 4 below:

Reaction Scheme 4

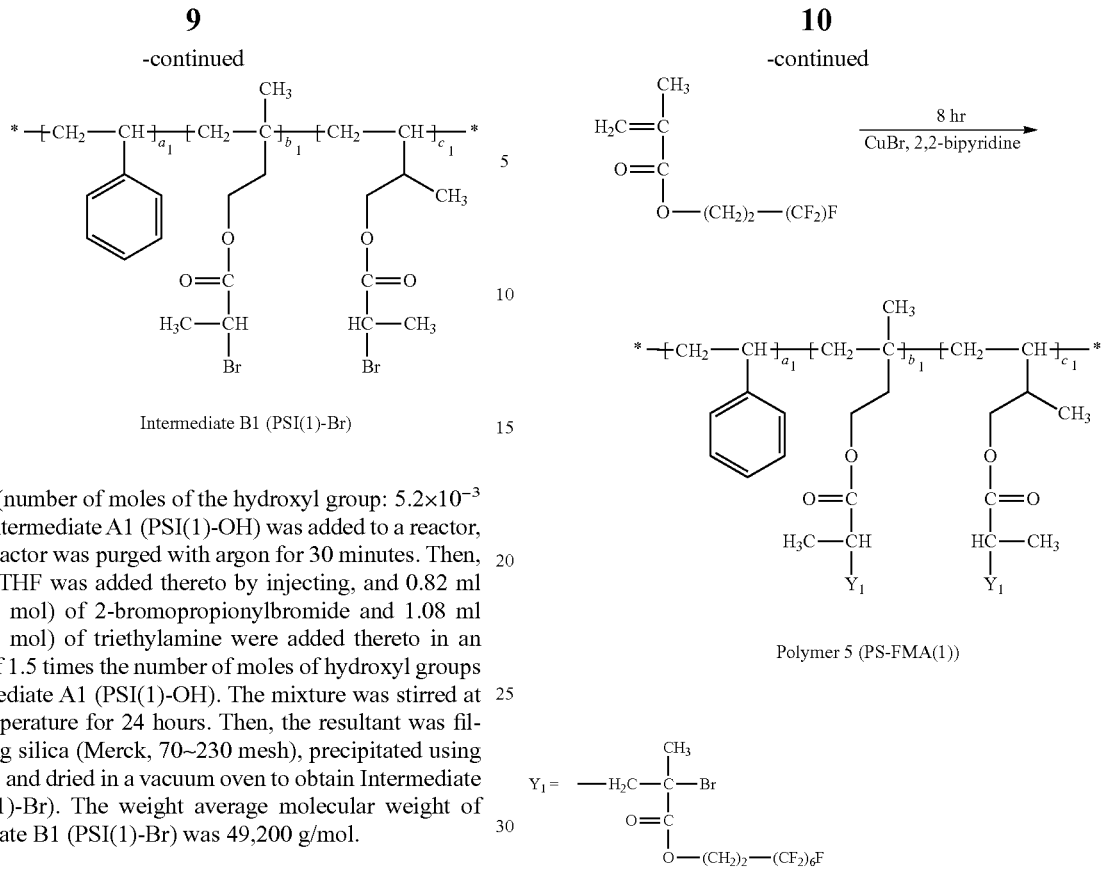

Polymer 5 (PS-FMA(1))

1.85 g of Intermediate B1 (PSI(1)-Br) (number of moles of Br: $3.4\times10^{-3}$ g/mol) was added to a reactor, and 0.63 g ($4.42\times10^{-3}$ g/mol) of CuBr as a reaction catalyst and 1.03 g ($6.63\times10^{-3}$ g/mol) of 2,2-dipyridyl (1.5 times moles of CuBr) as a ligand were added to the reactor. The reactor was purged with argon for 30 minutes, and 30 ml of toluene was added thereto. The reactor was heated to 90° C., and 1.28 ml ($4.42\times10^{-3}$ g/mol) of tridecafluorooctylmethylmethacrylate was added thereto by injection, and the reaction was carried out for 8 hours. Then, the product was filtered using alumina, precipitated using n-hexane, and dried in a vacuum oven to obtain Polymer 5 (PSI-FMA(1)). In Polymer 5 (PSI-FMA(1)), the ratio of $a_1:b_1+c_1$: FMA (FMA is number of units reacted with tridecafluorooctylmethylmethacrylate) was 280:140:66, and the weight average molecular weight was 77,700 g/mol.

Figure 1B:
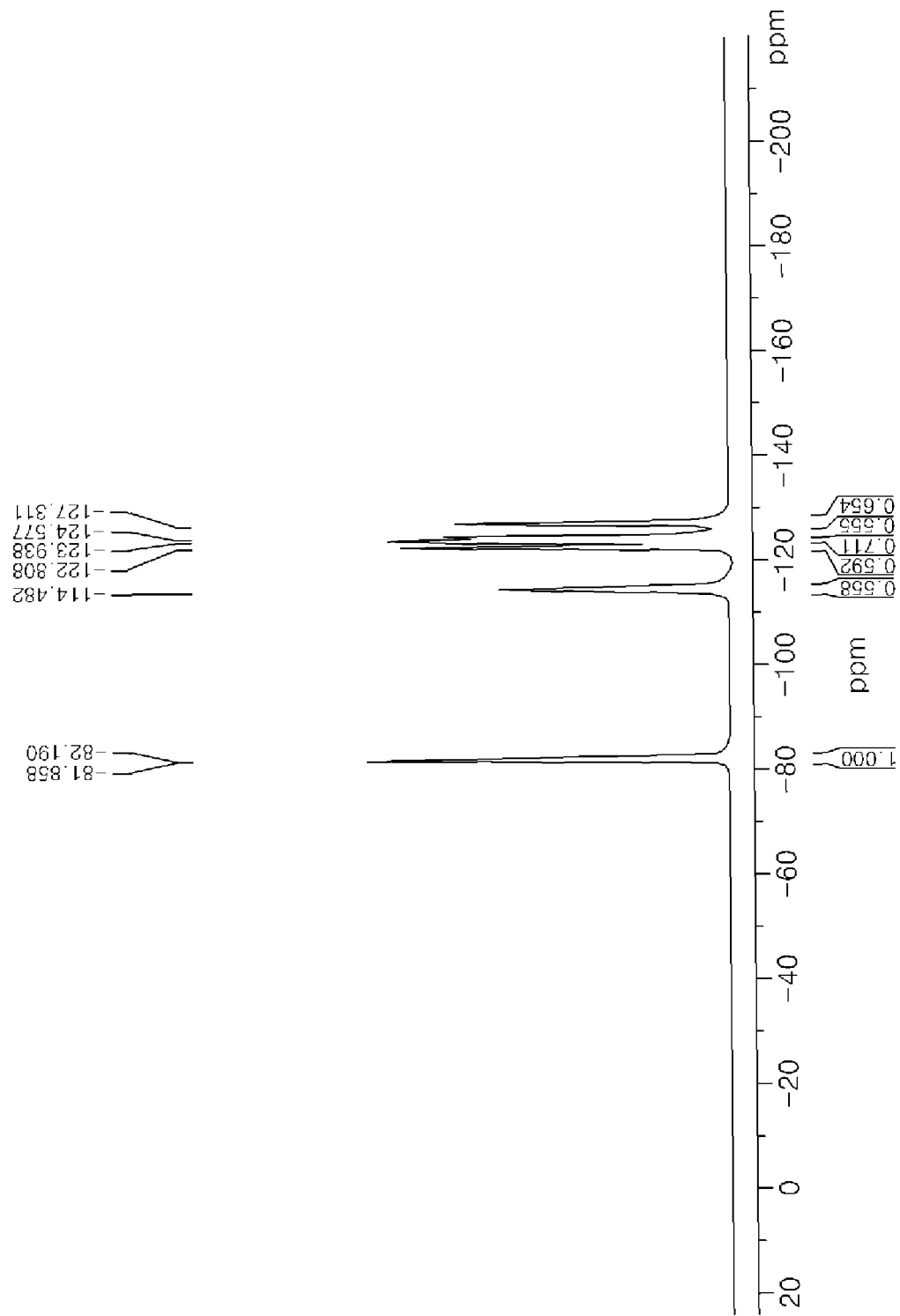
FIG. 1B is a $^{19}$F-NMR spectrum of an exemplary polymer.

FIG. 1A is a $^1$H-NMR spectrum of Polymer 5, and FIG. 1B is a $^{19}$F-NMR spectrum of Polymer 5 in CDCl$_3$.

Synthesis Example 10

Polymer 6 (PSI-FMA(2)) was synthesized in the same manner as in Synthesis Example 9, except that 1.85 g of Intermediate B1 (PSI(1)-Br) (number of moles of Br: $3.4\times10^{-3}$ g/mol), 0.63 g ($4.42\times10^{-3}$ g/mol) of CuBr, 1.03 g ($6.63\times10^{-3}$ g/mol) of 2,2-bipyridine and 5.66 ml (0.017 mol) of tridecafluorooctyl methylmethacrylate.

Synthesis Example 11

Polymer 7 (PSI-FMA(3)) was synthesized according to Reaction Scheme 5 below:

Reaction Scheme 5

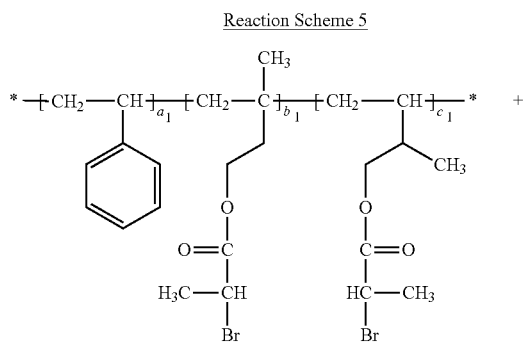

Intermediate B1 (PSI(1)-Br)

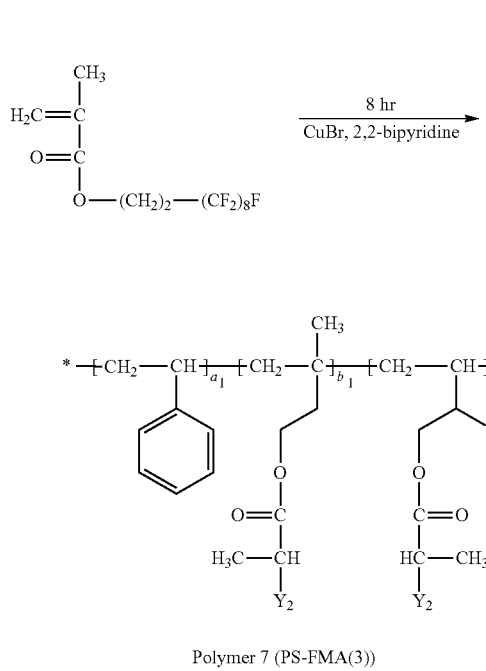

Polymer 7 (PS-FMA(3))

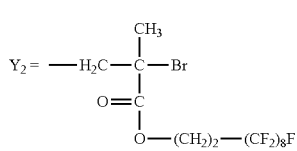

Polymer 7 (PSI-FMA(3)) was synthesized in the same manner as in Synthesis Example 9, except that 1.85 g of Intermediate B1 (PSI(1)-Br) (number of moles of Br: $3.4 \times 10^{-3}$ g/mol), 0.63 g ($4.42 \times 10^{-3}$ g/mol) of CuBr, 1.03 g ($6.63 \times 10^{-3}$ g/mol) of 2,2-dipyridyl and 1.47 ml ($4.42 \times 10^{-3}$ g/mol) of heptadecafluorodecylmethylmethacrylate instead of tridecafluorooctyl methylmethacrylate.

Synthesis Example 12

Polymer 8 (PSI-FMA(4)) was synthesized according to Reaction Scheme 6 below:

Reaction Schem 6

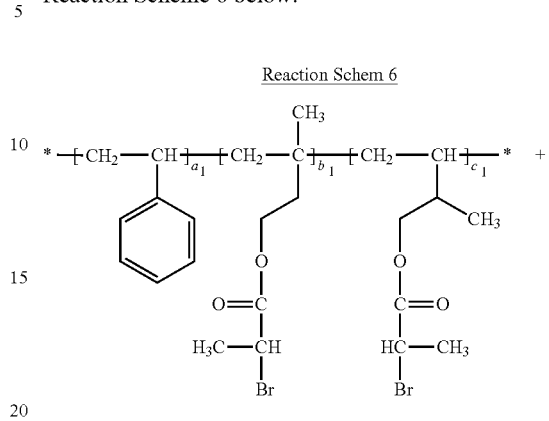

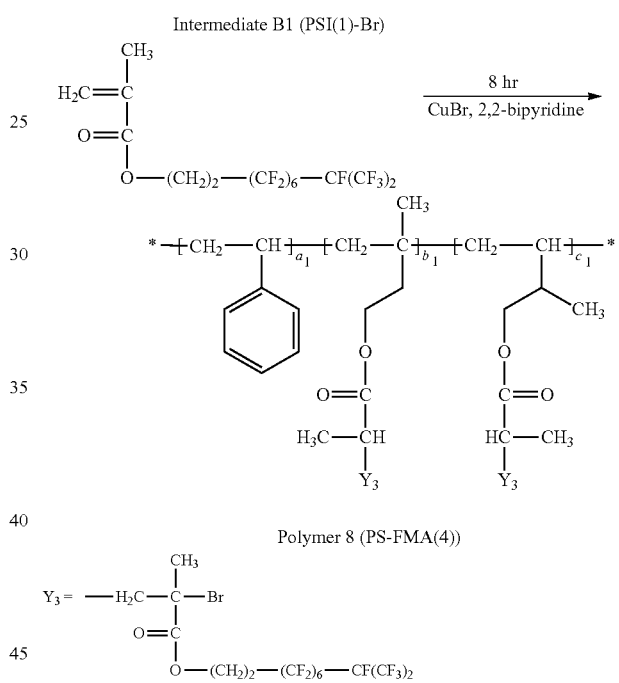

Polymer 8 (PSI-FMA(4)) was synthesized in the same manner as in Synthesis Example 9, except that 1.85 g of Intermediate B1 (PSI(1)-Br) (number of moles of Br: $3.4 \times 10^{-3}$ g/mol), 0.63 g ($4.42 \times 10^{-3}$ g/mol) of CuBr, 1.03 g ($6.63 \times 10^{-3}$ g/mol) of 2,2-dipyridyl and 1.58 ml ($4.42 \times 10^{-3}$ g/mol) of hexadecafluoro-9-(trifluoromethyl)decylmethacrylate were used.

Synthesis Example 13

Polymer 9 (PSI-FMA(7)) was synthesized in the same manner as in Synthesis Example 9, except that 2 g of Intermediate B2 (PSI(2)-Br) (number of moles of Br: $2.28 \times 10^{-3}$ g/mol), 0.49 g ($3.42 \times 10^{-3}$ g/mol) of CuBr, 0.8 g ($5.13 \times 10^{-3}$ g/mol) of 2,2-dipyridyl and 0.86 ml ($2.96 \times 10^{-3}$ g/mol) of tridecafluorooctylmethylmethacrylate were used.

Figure 2A:
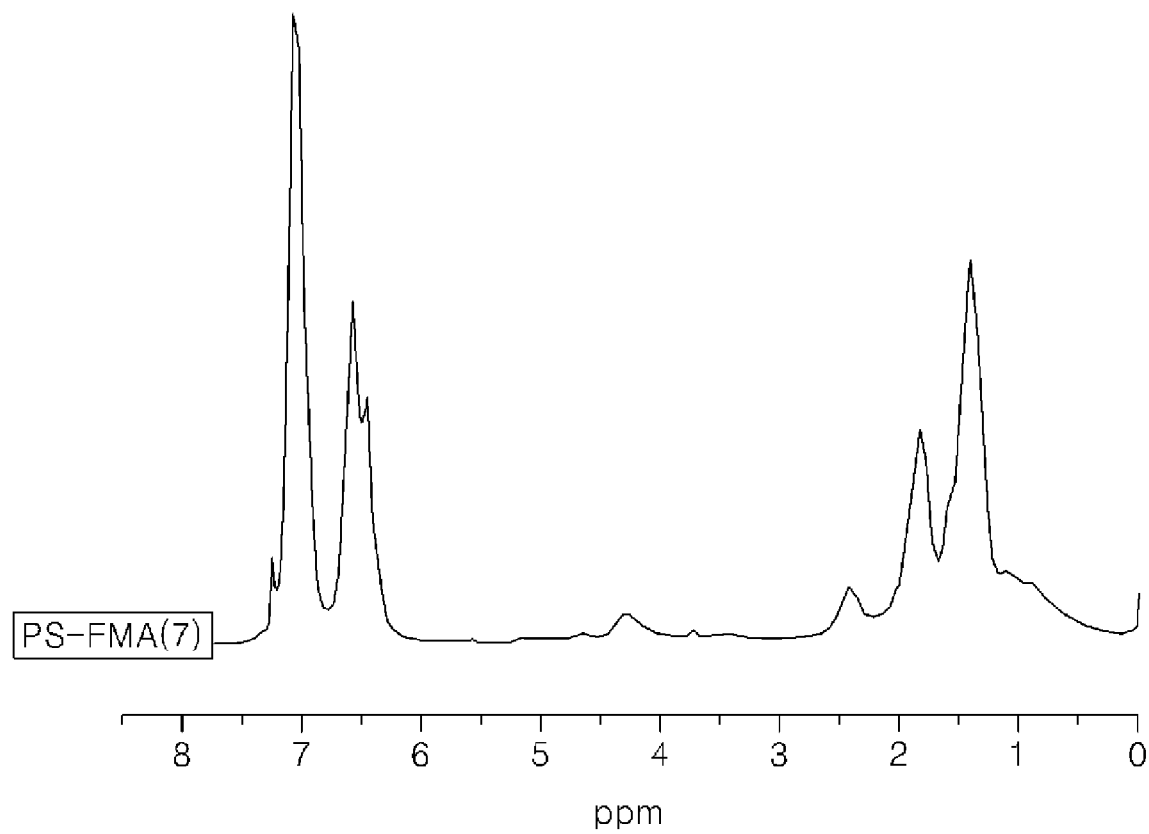
FIG. 2A is a $^1$H-NMR spectrum of an exemplary polymer according to an embodiment.
Figure 2B:
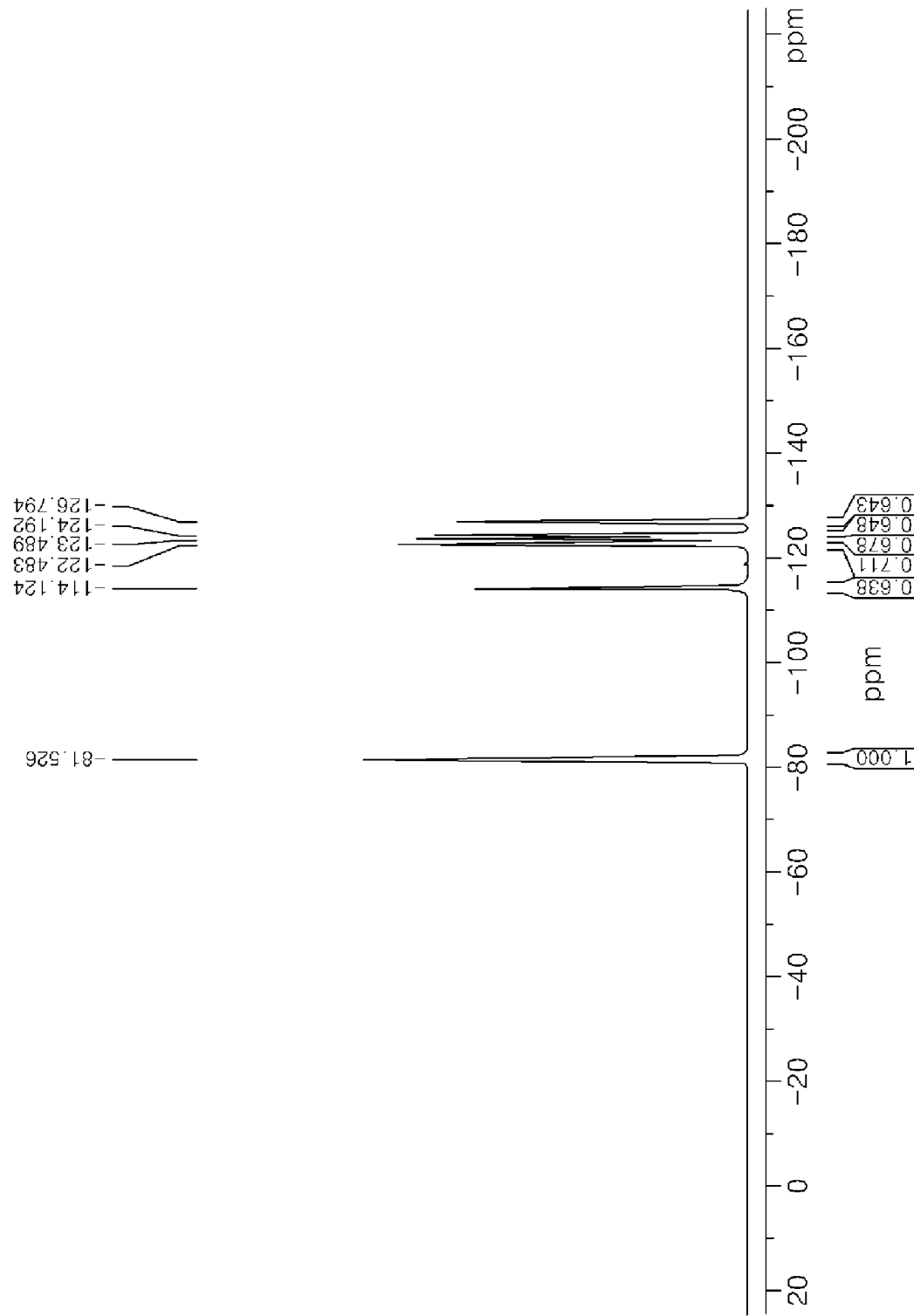
FIG. 2B is a $^{19}$F-NMR spectrum of an exemplary polymer.

FIG. 2A is a $^1$H-NMR spectrum of Polymer 9, and FIG. 2B is a $^{19}$F-NMR spectrum of Polymer 9 in CDCl$_3$.

Comparative Example 1

1 g of Polymer 1 (PSI(1)) was added to 50 g of chloroform and the solution was stirred until Polymer 1 (PSI(1)) is completely dissolved to prepare Polymer 1 (PSI(1)) solution. 1 ml of the Polymer 1 (PSI(1)) solution was spread on a piece of soda-lime glass. The product was dried at room temperature for 2 hours, and further dried at 60° C. in a vacuum oven for 12 hours to form Polymer 1 (PSI(1)) layer on the soda-lime glass with a thickness of 0.1 mm which is Sample A.

Comparative Example 2

A polymer layer was formed on soda-lime glass in the same manner as in Comparative Example 1, except that 0.33 g of $SiO_2$ particles (average particle diameter: 3 μm, (Acematt OK520), in which the weight ratio of Polymer 1(PSI(1)): $SiO_2$ particles $SiO_2$ is 3:1) was further added to 50 g of chloroform in addition to 1 g of Polymer 1 (PSI(1)). The resulting layer is Sample B.

Comparative Examples 3 and 4

Polymer layers were formed in the same manner as respectively in Comparative Examples 1 and 2, except that Polymer 3 (PSI(6)) was used instead of Polymer 1 (PSI(1)) of Comparative Examples 1 and 2. The resulting layers correspond to Samples C and D.

Comparative Examples 5 and 6

Polymer layers were formed in the same manner as respectively in Comparative Examples 1 and 2, except that Polymer 4 (PSI(7)) was used instead of Polymer 1 (PSI(1)) of Comparative Examples 1 and 2. The layers correspond to Samples E and F.

Examples 1 and 2

Polymer layers were formed in the same manner as respectively in Comparative Examples 1 and 2, except that Polymer 5 (PS-FMA(1)) was used instead of Polymer 1 (PSI(1)) of Comparative Examples 1 and 2. The layers correspond to Samples 1 and 2.

Example 3 and 4

Polymer layers were formed in the same manner as respectively in Comparative Examples 1 and 2, except that Polymer 9 (PS-FMA(7)) was used instead of Polymer 1 (PSI(1)) of Comparative Examples 1 and 2. The layers are Samples 3 and 4.

Evaluation Example 1

Measuring Contact Angle and Surface Energy

Contact angle with water, contact angle with diiodomethane and surface energy of Samples A to F and 1 to 4 were measured with and without silica particles present. The contact angle was measured by a Sessile Drop method using a DSA100 (Kruss GmbH). Meanwhile, the surface energy was measured by Owens-Wendt-geometric mean method. The results are shown in Table 1 below:

TABLE 1

| No. of Sample | Polymer | $SiO_2$ Particles Present? (Y/N) | Contact angle with water | Contact angle with diiodomethane | Surface energy (dyne/cm) |
|---|---|---|---|---|---|
| A | Polymer 1 (PSI(1)) | Y | 95 | 43 | 37.5 |
| B | Polymer 1 (PSI(1)) | N | 140 | 70 | 28.9 |
| C | Polymer 3 (PSI(6)) | Y | 90 | 40 | 39.2 |
| D | Polymer 3 (PSI(6)) | N | 130 | 65 | 29.6 |
| E | Polymer 4 (PSI(7)) | Y | 90 | 45 | 36.8 |
| F | Polymer 4 (PSI(7)) | N | 91 | 70 | 25.3 |
| 1 | Polymer 5 (PS-FMA(1)) | Y | 110 | 83 | 15.9 |
| 2 | Polymer 5 (PS-FMA(1)) | N | 158 | 86 | 21.3 |
| 3 | Polymer 9 (PS-FMA(7)) | Y | 106 | 79 | 18.0 |
| 4 | Polymer 9 (PS-FMA(7)) | N | 145 | 81 | 22.0 |

According to Table 1, all of Samples 1 to 4 have higher contact angle with water and higher contact angle with diiodomethane than Samples A to F, and thus it can be seen that Samples 1 to 4 have far lower surface energy than Samples A to F. The samples having the silica particles present generally have lower contact angles.

Evaluation Example 2

Evaluating Degree of Attachment of Microorganism to Sample C

Sample C was cut into square pieces to prepare 6 samples having a size of 5.0 cm×5.0 cm (total area of 25 $cm^2$). Two of the 6 samples were immersed in 120 ml of aqueous phosphate-buffered solution ("PBS") containing *E. Coli*(−) (1.0× $10^8$ colony forming units ("cfu") per 1 ml of PBS) and 120 ml of PBS containing yeast (1.0×$10^8$ cfu per 1 ml of PBS) at 4° C. for 1 hour. Then, the samples were washed with sterilized PBS 5 times for 1 minute each to remove microorganisms that were not attached to the samples. Then, the samples were sonicated using a scientific sonic dismembrator model 500 (Fisher) with 30% intensity for 45 seconds to remove the attached microorganisms. The microorganisms were applied to a solid medium and the number of the attached microorganisms was calculated to evaluate the degree of attachment of microorganism. The experiment was further repeated twice, and an average degree of attachment of microorganism was calculated using the obtained three results. As a result, the degree of attachment of *E. Coli*(−) to Sample C was 97×$10^3$ cfu/$cm^2$, and the degree of attachment of yeast thereto was 4,260 cfu/$cm^2$.

Evaluation Example 3

Evaluating Degree of Attachment of Microorganism to Sample D

Sample D was cut into square pieces to prepare 6 samples each having a size of 5.0 cm×5.0 cm (total area of 25 $cm^2$). Two of the 6 samples were immersed in 120 ml of PBS containing *E. Coli*(−) (1.0×$10^8$ cfu per 1 ml of PBS) and 120 ml of PBS containing yeast ($1.0\times10^8$ cfu per 1 ml of PBS) at 4° C. for 1 hour. Then, the samples were washed with sterilized PBS 5 times for 1 minute each to remove microorganisms that were not attached to the samples. Then, the samples were sonicated using a scientific sonic dismembrator model 500 (Fisher) with 30% intensity for 45 seconds to remove the attached microorganisms. The microorganisms were applied to a solid medium and the number of the attached microorganisms was calculated to evaluate the degree of attachment of microorganism. The experiment was further repeated twice, and an average degree of attachment of microorganism was calculated using the obtained three results. As a result, the degree of attachment of *E. Coli*(−) to Sample D was $18\times10^3$ cfu/cm$^2$, and the degree of attachment of yeast thereto was 3,860 cfu/cm$^2$.

Evaluation Example 4

Evaluating Degree of Attachment of Microorganism to Sample 1

Sample 1 was cut into square pieces to prepare 3 samples having a size of 5.0 cm×5.0 cm (total area of 25 cm$^2$). One of the 3 samples was immersed in 120 ml of PBS containing *E. Coli*(−) ($1.0\times10^8$ cfu per 1 ml of PBS) at 4° C. for 1 hour. Then, the sample was washed with sterilized PBS 5 times for 1 minute each to remove microorganisms that were not attached to the sample. Then, the sample was sonicated using a scientific sonic dismembrator model 500, (Fisher) with 30% intensity for 45 seconds to remove the attached microorganisms. The microorganisms were applied to a solid medium and the number of the attached microorganisms was calculated to evaluate the degree of attachment of microorganism. The experiment was further repeated twice, and an average degree of attachment of microorganism was calculated using the obtained three results. As a result, the degree of attachment of *E. Coli*(−) to Sample 1 was 2,760 cfu/cm$^2$.

Evaluation Example 5

Evaluating Degree of Attachment of Microorganism to Sample 2

Sample 1 was cut into square pieces to prepare 3 samples having a size of 5.0 cm×5.0 cm (total area of 25 cm$^2$). One of the 3 samples was immersed in 120 ml of PBS containing yeast ($1.0\times10^8$ cfu per 1 ml of PBS) at 4° C. for 1 hour. The sample was washed with sterilized PBS 5 times for 1 minute each to remove microorganisms that were not attached to the sample. Then, the sample was sonicated using a scientific sonic dismembrator model 500 (Fisher) with 30% intensity for 45 seconds to remove the attached microorganisms. The microorganisms were coated on a solid medium and the number of the attached microorganisms was calculated to evaluate the degree of attachment of microorganism. The experiment was further repeated twice, and an average degree of attachment of microorganism was calculated using the obtained three results. As a result, the degree of attachment of yeast to Sample 2 was 80 cfu/cm$^2$.

Evaluation Example 6

Evaluating Degree of Attachment of Microorganism to Soda-Lime Glass

A piece of soda-lime glass was cut into square pieces to prepare 6 samples having a size of 5.0 cm×5.0 cm (total area of 25 cm$^2$). Two of the 6 samples were immersed in 120 ml of PBS containing *E. Coli*(−) ($1.0\times10^8$ cfu per 1 ml of PBS) and 120 ml of PBS containing yeast ($1.0\times10^8$ cfu per 1 ml of PBS) at 4° C. for 1 hour. Then, the samples were washed with sterilized PBS 5 times for 1 minute each to remove microorganisms that were not attached to the samples. Then, the samples were sonicated using a scientific sonic dismembrator model 500 (Fisher) with 30% intensity for 45 seconds to remove the attached microorganisms. The microorganisms were applied to a solid medium and the number of the attached microorganisms was calculated to evaluate the degree of attachment of microorganism. The experiment was further repeated twice, and an average degree of attachment of microorganism was calculated using the obtained three results. As a result, the degree of attachment of *E. Coli*(−) to soda-lime glass was $23\times10^3$ cfu/cm$^2$, and the degree of attachment of yeast thereto was 880 cfu/cm$^2$.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polymer for forming a hydrophobic layer represented by Formula 1 below and having a weight average molecular weight of about 10,000 to about 500,000 g/mol:

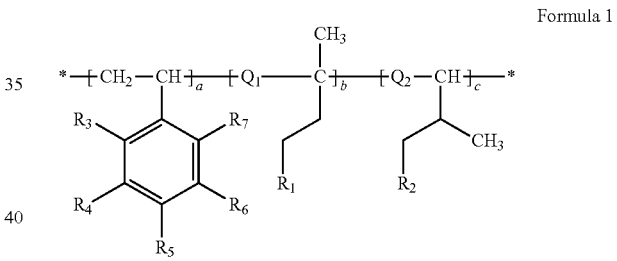

Formula 1 wherein $Q_1$ and $Q_2$ are each independently a linear or branched $C_1$-$C_{10}$ alkylene group;

$R_1$ and $R_2$ are each independently a substituent selected from the group consisting of —O—$Z_1$, —O—C(O)—$Z_2$, —O—$Z_3$—C(O)—O—$Z_4$ and —O—C(O)—$Z_5$—C(O)—O—$Z_6$; wherein $Z_1$, $Z_2$, $Z_4$ and $Z_6$ are each independently a linear or branched $C_1$-$C_{30}$ alkyl group, wherein at least one hydrogen atom of the linear or branched $C_1$-$C_{30}$ alkyl group is substituted with F; and $Z_3$ and $Z_5$ are each independently a linear or branched $C_1$-$C_{20}$ alkylene group, wherein at least one hydrogen atom of the linear or branched $C_1$-$C_{20}$ alkylene group is substituted by one selected from the group consisting of Cl, Br and I;

$R_3$ to $R_7$ are each independently selected from the group consisting of a hydrogen atom, a halogen atom, a cyano group, an amino group, a $C_1$-$C_{10}$ alkyl group and a $C_6$-$C_{12}$ aryl group; and the ratio of a:b+c is from 10:1 to 1:1,000.

2. The polymer of claim 1, wherein $Q_1$ and $Q_2$ are each independently a $C_1$-$C_5$ alkylene group.

3. The polymer of claim 1, wherein $Z_1$, $Z_2$, $Z_4$ and $Z_6$ are each independently selected from the group consisting of —(CH$_2$)$_{p_1}$-(CF$_2$)$_{q_1}$F, —(CH$_2$)$_{p_2}$-(CF$_2$)$_{q_2}$—C(CF$_3$)F$_2$ and —$(CH_2)_{p_3}$-$(CF_2)_{q_3}$-$C(CF_3)_2F$, $p_1$ to $p_3$ are each independently an integer of 1 to 5, and $q_1$ to $q_3$ are each independently an integer of 1 to 20.

4. The polymer of claim 1, wherein $Z_3$ and $Z_5$ are each independently selected from the group consisting of —CH$(CH_3)$—$(CH_2)_{p_4}$-$C(CH_3)(Br)$—, —CH$(CH_3)$—$(CH_2)_{p_5}$—C$(CH_3)$H—, —CH$(CH_3)$—$(CH_2)_{p_6}$- and —$(CH_2)_{p_7}$-C$(CH_3)(Br)$—, and $p_4$ to $p_7$ are each independently an integer of 1 to 10.

5. The polymer of claim 1, wherein $R_3$ to $R_7$ are each independently selected from the group consisting of a hydrogen atom, a halogen atom, a cyano group, an amino group, a methyl group, an ethyl group, a propyl group and a butyl group.

6. The polymer of claim 1, wherein $R_1$ and $R_2$ are each independently selected from the group consisting of —$OCH_2CH_2C_2F_5$, —$OCH_2CH_2CH_2C_2F_5$, —$OCH_2CH_2C_3F_7$, —$OCH_2CH_2CH_2C_3F_7$, —O—C(O)—$CH_2CH_2C_2F_5$, —O—C(O)—$CH_2CH_2CH_2C_2F_5$, —O—C(O)—$CH_2CH_2C_3F_7$, —O—C(O)—$CH_2CH_2CH_2C_3F_7$, —O—C(O)—CH$(CH_3)$—$CH_2$—C$(CH_3)(Br)$—C(O)—O—$(CH_2)_2$—$(CF_2)_6F$, —O—C(O)—CH$(CH_3)$—$CH_2$—C$(CH_3)(Br)$—C(O)—O—$(CH_2)_2$—$(CF_2)_8F$, and —O—C(O)—CH$(CH_3)$—$CH_2$—C$(CH_3)(Br)$—C(O)—O—$(CH_2)_2$—$(CF_2)_8$—$C(CF_3)_2F$.

* * * * *